Aug. 4, 1959     T. B. REED ET AL     2,898,441
ARC TORCH PUSH STARTING
Filed July 3, 1957
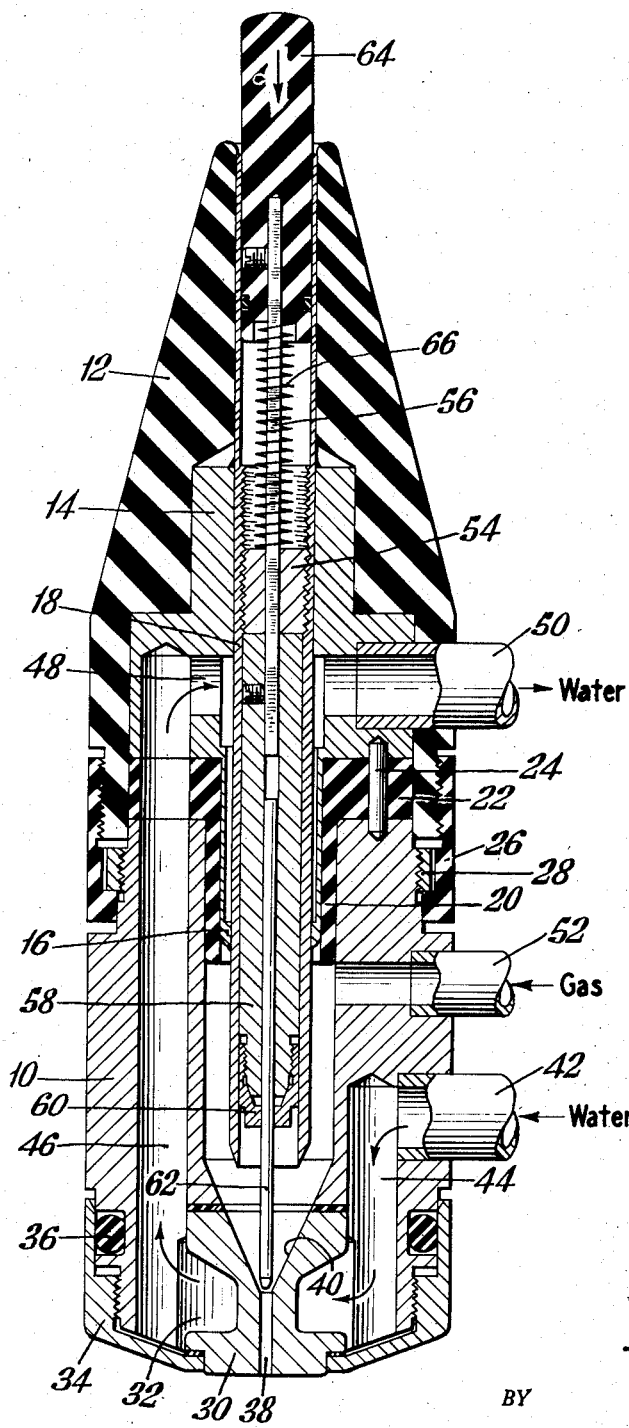
INVENTORS
THOMAS B. REED
MARTIN T. SMITH, JR.
BY
Richard S. Shreve Jr.
ATTORNEY

2,898,441

ARC TORCH PUSH STARTING

Thomas B. Reed, Danville, and Martin T. Smith, Jr., Indianapolis, Ind., assignors to Union Carbide Corporation, a corporation of New York Application July 3, 1957, Serial No. 669,785

1 Claim. (Cl. 219—75)

This invention relates to arc torch push starting, and more particularly to method and apparatus for striking the arc and initiating the operation of the arc torch according to the copending applications of R. M. Gage Serial No. 524,353 and Serial No. 539,794.

The wall-stabilized arcs of transferred and non-transferred arc torch processes have previously been initiated by superimposing a high frequency potential onto the D.C. or A.C. potential applied between the electrodes. This procedure has several major disadvantages: it requires a separate, expensive source of high frequency power; it requires additional insulation in the torch apparatus; and it interferes with radio and television reception in the immediate vicinity. In some commercial applications of the arc torch process the high frequency power has been rendered ineffective for arc initiation due to conductance by minerals in the torch cooling water.

The main objects of the present invention are to avoid the difficulties referred to above, and to provide method and apparatus to employ relative motion of structural parts for the starting expedient.

A relatively simple solution has been found for starting arc torch processes which eliminates high frequency power. This novel procedure involves touching the torch inner electrode to the torch nozzle electrode and then retracting it to form the arc. In the case of the non-transferred arc torch process the resulting arc is the main process arc. In the case of the transferred arc torch process the resulting arc becomes the pilot arc which initiates the main arc from inner electrode to workpiece. This procedure is unobvious since prior art teaching would lead one to predict that touch starting would erode the nozzle electrode due to resistance heating and arc pitting. This erosion was found to be negligible.

The present models of the arc torch employing this principle use a metallic spring to retract the inner electrode from the nozzle electrode. Future models could possibly employ a magnetic retract mechanism operated on electromagnetic forces produced by the welding current input.

Different arc shielding gases, such as argon, hydrogen, nitrogen, and helium, require different potentials for arc initiation. The push-start method enables positive starts to be obtained in any gas provided sufficient power is available to maintain the arc.

The accompanying drawing shows an arc torch apparatus embodying the principles of the subject invention. Early models placed the retract spring near the lower end of the inner electrode. This position was found to be unsatisfactory since the heat from the arc affected the physical properties of the spring. Recent models place the spring at the upper end of the inner electrode and have operated quite successfully.

The torch shown in the drawing comprises a body having a lower anode portion 10 and an upper cathode portion 12, secured together in axially aligned relation. The cathode portion comprises insulation molded about a metallic insert 14 which has a central depending cathode cooling sleeve 16. Permanently secured in an axial bore in the upper body portion 12 is a push start sleeve or barrel 18, preferably silver soldered at the top of the insert 14 and at the bottom of the sleeve 16.

The lower anode body portion 10 is constructed of metal, preferably aluminum, brass or stainless steel, having a central bore aligned with the upper body bore but of larger diameter to receive a centering sleeve 20 of insulation having a radial flange 22 interposed between the upper and lower bodies. A plastic pin 24 passes through the flange into registering holes in these bodies. An insulating connecting ring 26 is screwed onto the cathode body 12, and has an internal shoulder receiving a retainer ring 28 screwed onto the anode body 10.

The bottom of the anode body 10 is counterbored to receive a nozzle anode 30, and to form an annular cooling jacket 32 therearound. The anode 30 is secured in position by a retaining cap 34 screwed onto the anode body 10 and compressing an O-ring packing 36. The anode nozzle 30 has a central bore 38 with a conical top entrance 40. This anode nozzle is constructed of metal, preferably copper, and may have an internal tungsten insert.

Cooling water inlet and anode connection 42 is connected by a vertical bore 44 to the annular anode cooling jacket 32. A vertical bore 46 on the opposite side connects the jacket 32 to a cross bore 48 communicating with the cathode cooling sleeve 16. The opposite end of the cross bore 48 is the cooling water outlet and cathode connection 50. Shielding gas enters at inlet 52 and fills the annular space below the centering sleeve 20 and surrounding the barrel 18 and passes through the conical entrance 40 and out through the bore 38.

The barrel 18 extends from the top of the body 12 down close to the nozzle 30, and is provided intermediate its ends with a set back plug 54 screwed into a threaded intermediate portion thereof. A square cross-section setback rod 56 slides through a square cross-section hole in the plug 54 and carries therebelow a cathode collet 58 secured to the rod and slidable therewith in the barrel 18. A cap nut 60 secures a stick electrode cathode 62 preferably of tungsten in the collet 58. The set back rod 56 extends up near the top of the body 12 to receive a push button 64 slidable in the barrel 18. A coil compression spring 66 surrounds the rod 56 between the push button 64 and the plug 54.

Rotation of push button 64 results in rotation of set back rod 56 and set back plug 54. This causes plug 54 to move up or down depending upon direction of rotation. Compression of spring 66 causes push button 64 and consequently rod 56, collet 58 and electrode 62 to follow the axial motion of plug 54. It is thus seen that the arc length between end of electrode 62 and nozzle electrode 30 can be easily adjusted by rotation of push button 64.

The arc is initiated by pushing button 64 until electrode 62 comes into arcing relationship with nozzle electrode 30 and then releasing pressure to allow spring 66 to retract electrode 62 to preset position.

What is claimed is:

Apparatus for starting an arc torch having a barrel, an electrode holder in said barrel and connected to a source of current, and an arc wall-stabilizing nozzle insulated from said electrode holder and connected to said source, which comprises a plunger slidably mounted in said barrel and from which said electrode holder depends, a push button slidable in top of said barrel for pushing said plunger and rod to bring the electrode tip into starting relationship with said arc wall-stabilizing nozzle, a coil compression spring engaging said button for retracting said electrode tip from starting relationship, and a set back plug for adjusting retract distance of said electrode tip from said arc wall-stabilizing nozzle.

References Cited in the file of this patent

UNITED STATES PATENTS

| | | |
|---|---|---|
| 1,002,721 | Mathers | Sept. 5, 1911 |
| 2,468,807 | Herbst | May 3, 1949 |